US011724365B2

(12) United States Patent
Mondini (10) Patent No.: US 11,724,365 B2
(45) Date of Patent: Aug. 15, 2023

(54) SUCTION DEVICE FOR RETAINING AND/OR TRANSPORTING OBJECTS OF DIFFERENT FORMATS (71) Applicant: MONDINI S.R.L., Brescia (IT)

(72) Inventor: Giovanni Mondini, Cologne (IT)

(73) Assignee: MONDINI S.R.L., Brescia (IT)

(*) Notice: Subject to any disclaimer, the term of this patent is extended or adjusted under 35 U.S.C. 154(b) by 1001 days.

(21) Appl. No.: 16/502,874

(22) Filed: Jul. 3, 2019

(65) Prior Publication Data
US 2020/0009707 A1 Jan. 9, 2020

(30) Foreign Application Priority Data

Jul. 6, 2018 (IT) .................. 102018000006994

(51) Int. Cl.
B25B 11/00 (2006.01)
B29C 51/18 (2006.01)
(Continued)

(52) U.S. Cl.
CPC ............ *B25B 11/005* (2013.01); *B23Q 3/088* (2013.01); *B25B 11/002* (2013.01); *B29C 51/18* (2013.01);
(Continued)

(58) Field of Classification Search
CPC ..... B25B 11/005; B25B 11/002; B23Q 3/088; B23Q 1/0072; B29C 51/18; B29C 51/261;
(Continued)

(56) References Cited

U.S. PATENT DOCUMENTS 4,703,966 A * 11/1987 Lewecke ............... B66C 1/0243
294/188
4,811,831 A * 3/1989 Honkomp .............. B65G 47/24
198/765

(Continued)

FOREIGN PATENT DOCUMENTS

DE 202016107328 U1 3/2018
EP 3241664 A1 11/2017
JP S6266909 A 3/1987

*Primary Examiner* — Lee D Wilson
*Assistant Examiner* — Jacob Adam Montgomery
(74) *Attorney, Agent, or Firm* — Pearne & Gordon LLP; J. Gregory Chrisman (57) ABSTRACT A suction device for retaining and/or transporting objects, comprising a main supporting body (2) and at least one operating plate (3) provided with suction holes (7) connected to and suction means, in which the operating plate (3) is removably associated with the main supporting body (2) and has a second connecting face (5) coupled to a first connecting face (4) of the main supporting body (2), and in which the device also comprises one or more magnets (13) and one or more ferromagnetic bodies (14), each ferromagnetic body (14) being magnetically coupled to one or more magnets (13) when the operating plate (3) is associated with the main supporting body (2) for keeping the operating plate (3) fastened to the main supporting body (2), each magnet (13) and the ferromagnetic body (14) magnetically coupled to it being constrained respectively one to the operating plate (3), the other to the main supporting body (2).

13 Claims, 5 Drawing Sheets (51) Int. Cl.
*B65B 7/16* (2006.01)
*F16M 13/02* (2006.01)
*B65H 5/14* (2006.01)
*B23Q 3/08* (2006.01)
*B29C 51/26* (2006.01)
*B66C 1/02* (2006.01)
*B29L 31/00* (2006.01)

(52) U.S. Cl.
CPC .............. B65B 7/164 (2013.01); B65H 5/14 (2013.01); B66C 1/0281 (2013.01); F16M 13/02 (2013.01); *B29C 51/262* (2013.01); *B29L 2031/712* (2013.01)

(58) Field of Classification Search
CPC ............ B29C 51/262; B65H 2406/343; B65H 2402/10; B65H 2555/41; B29L 2031/712; B65B 7/164; B65B 5/08; B65B 5/14; B66C 1/0281; F16M 13/02; B23K 37/047; B23K 2101/006; B23K 31/02; B23P 2700/50; B23P 21/00; B23P 19/04; B62D 65/18; B62D 65/022; B62D 65/026

USPC .......................................................... 269/21
See application file for complete search history.

(56) References Cited

U.S. PATENT DOCUMENTS

| | | | |
|---|---|---|---|
| 5,323,590 A * | 6/1994 | Garwood | B29C 51/303 53/436 |
| 5,716,048 A | 2/1998 | Morrissette | |
| 5,758,874 A | 6/1998 | Morrissette | |
| 5,865,433 A | 2/1999 | Morrissette | |
| 2006/0157905 A1* | 7/2006 | Lenzini | B25B 11/005 269/21 |
| 2011/0123359 A1* | 5/2011 | Schaaf | F04F 5/467 417/174 |
| 2013/0078334 A1* | 3/2013 | Benedetti | B29C 51/22 425/522 |
| 2013/0127192 A1* | 5/2013 | Regan | B32B 38/1858 294/185 |
| 2014/0312576 A1* | 10/2014 | Bedell | H01L 21/6838 279/3 |
| 2017/0245406 A1* | 8/2017 | Mantani | B25B 11/002 |
| 2017/0320260 A1 | 11/2017 | Mondini | |

* cited by examiner

SUCTION DEVICE FOR RETAINING AND/OR TRANSPORTING OBJECTS OF DIFFERENT FORMATS

The present invention relates to a suction device for retaining and/or transporting objects, which can be adapted to objects with different formats.

The present invention can therefore be applied in any apparatus wherein a suction device for retaining and/or transporting objects is present and wherein the device provides for the use, at different times, of objects of different formats.

In particular, however, the present invention arises with reference to situations in which it is necessary to move and/or retain sheets of flat material such as, for example, in forming and sealing machines, etc. Indeed, in these types of machines, a single machine can often be used back to back for production processes in which sheets of different shapes and/or sizes must be used. By way of example, a single forming machine can be used for producing a single large container or several smaller containers. Similarly, a single sealing machine can be used for sealing both a single large container and a plurality of smaller containers.

Although reference is mainly made below to machines which are designed to move and/or retain sheets of flat material such as forming and sealing machines, and so on, the descriptions herein must be understood to be applicable also to machines of different types and objects of different types and shapes.

In all forming and sealing machines, before the actual step of forming or sealing, the sheet to be thermoformed or to be welded to a container for its sealing is generally retained and moved by one or more suction devices which have an operating surface in which a plurality of suction holes is made. These holes are generally grouped into the same number of groups as there are sheets to be simultaneously processed. Depending on the different embodiments, all suction holes can be designed to be controlled together or in subgroups to allow the apparatus to be more flexibly managed.

Moreover, the operating surface is generally structured to retain either a single object (sheet) or a plurality of objects (sheets) which can in turn all be of the same type (same format—identical shape and size) or not.

Currently, when a known apparatus needs to be switched from a first format (or combination of formats) to a second production format (or combination of formats), the procedures for changing the format are relatively long and complex. Indeed, besides the need to replace the various mould imprints each time, rather than the sealing heads, it is generally necessary to also replace part of the suction devices intended to retain and/or move the objects (not only those placed at the thermoforming or sealing station, but also those upstream of it). However, this intervention requires relatively high downtimes, also due to the fact that these are pneumatic circuit parts that require their gas seals to be perfectly restored upon each intervention.

In this context, the technical purpose of the present invention is to implement a suction device for retaining and/or transporting objects that offers a solution to the issues mentioned above.

In particular, the technical purpose of the present invention is to implement a suction device for retaining and/or transporting objects that makes format changing operations quicker and easier than in known devices.

The technical purpose and the aims indicated above are substantially achieved by a suction device for retaining and/or transporting objects in accordance with the contents of the claims enclosed.

Further features and the advantages of the present invention will become more apparent after a careful reading of the detailed description of a preferred, non-limiting embodiment of a suction device for retaining and/or transporting objects, as shown in the accompanying drawings, in which.

Referring to the figures mentioned above, the reference number 1 has been assigned to a complete suction device for retaining and/or transporting objects according to the present invention.

According to the present invention, the suction device 1 comprises a main supporting body 2 and at least one operating plate 3 removably associated with the main supporting body 2. In particular, the main supporting body 2 has at least one first connecting face 4, and the operating plate 3 has a second connecting face 5 which is coupled to the first connecting face 4 when the operating plate 3 is associated with the main supporting body 2.

In more complex embodiments, however, the main supporting body 2 can comprise a plurality of first connecting faces, and the suction device can comprise a plurality of operating plates 3, each of which is removably associated with one of the first connecting faces of the main supporting body 2. This situation can, for instance, be provided when the suction device 1 constitutes a rotating element intended to successively carry a plurality of objects at a processing station.

The operating plate 3 has an operating surface 6 situated on a side opposite the second connecting face 5, where a plurality of suction holes 7 is made. With the aim of making the figures more intelligible, the suction holes in the accompanying drawings have been shown exclusively along five quasi-rectangular perimeters which form five areas, each, in use, concerned with a sheet to be retained; however, it should also be considered that the suction holes 7 are advantageously distributed even within those areas.

The operating surface 6 has a first extension equal to the extension of the area containing all of the suction holes 7 as increased by a certain perimeter edge surrounding the suction holes 7 themselves (in most applications, the operating surface 6 will match the entire surface of the corresponding face of the operating plate 3, though this is not strictly necessary).

Advantageously, therefore, the operating surface 6 is flat, and the first connecting face 4 and the second connecting face 5 are also flat and parallel thereto (at least when the operating plate 3 is fixed to the main supporting body 2).

Although the operating plate 3 is shown to be constituted of a single element in the embodiments shown, in other embodiments it can also be constituted of a plurality of elements which can be placed side by side in such a way that each of them forms part of the operating surface 6 and part of the second connecting face 5.

According to the preferred embodiments of the present invention, and with the aim of being able to adapt the suction device 1 to objects of different format, for each first connecting face 4 present on the main supporting body 2, a plurality of operating plates 3 is designed to be present which are interchangeable and by turns associable with the main supporting body 2. Each operating plate 3 of said plurality of interchangeable operating plates 3 will have a different arrangement of the suction holes 7 on its operating surface 6. If the main supporting body 2 is configured to support several operating plates 3 simultaneously, these will be designed to have the same number of sets of interchangeable operating plates 3, advantageously identical to each other.

When the operating plate 3 is associated with the main supporting body 2, suction means are then in fluid connection with the plurality of suction holes 7 for sucking air through them. In use, the depression generated by the suction means at the suction holes 7 makes the device able to retain the objects on the operating surface 6.

In the known way, the suction means comprise an aspirator (not shown) in fluid connection with to the suction hole 7, as well as one or more main ducts 8 and one or more secondary ducts 9. The main ducts 8 are made in the main supporting body 2 extend as far as the first connecting face 4 where they define one or more first connecting mouths 10. The secondary ducts 9 made in the operating plate 3 extend from the second connecting face 5 where they define one or more second connecting mouths 11, as far as the suction holes 7.

In the embodiment shown, the secondary ducts 9 each have a first end which defines a suction hole 7 and a second end which opens into a second connecting mouth 11.

Figures 4, 5:
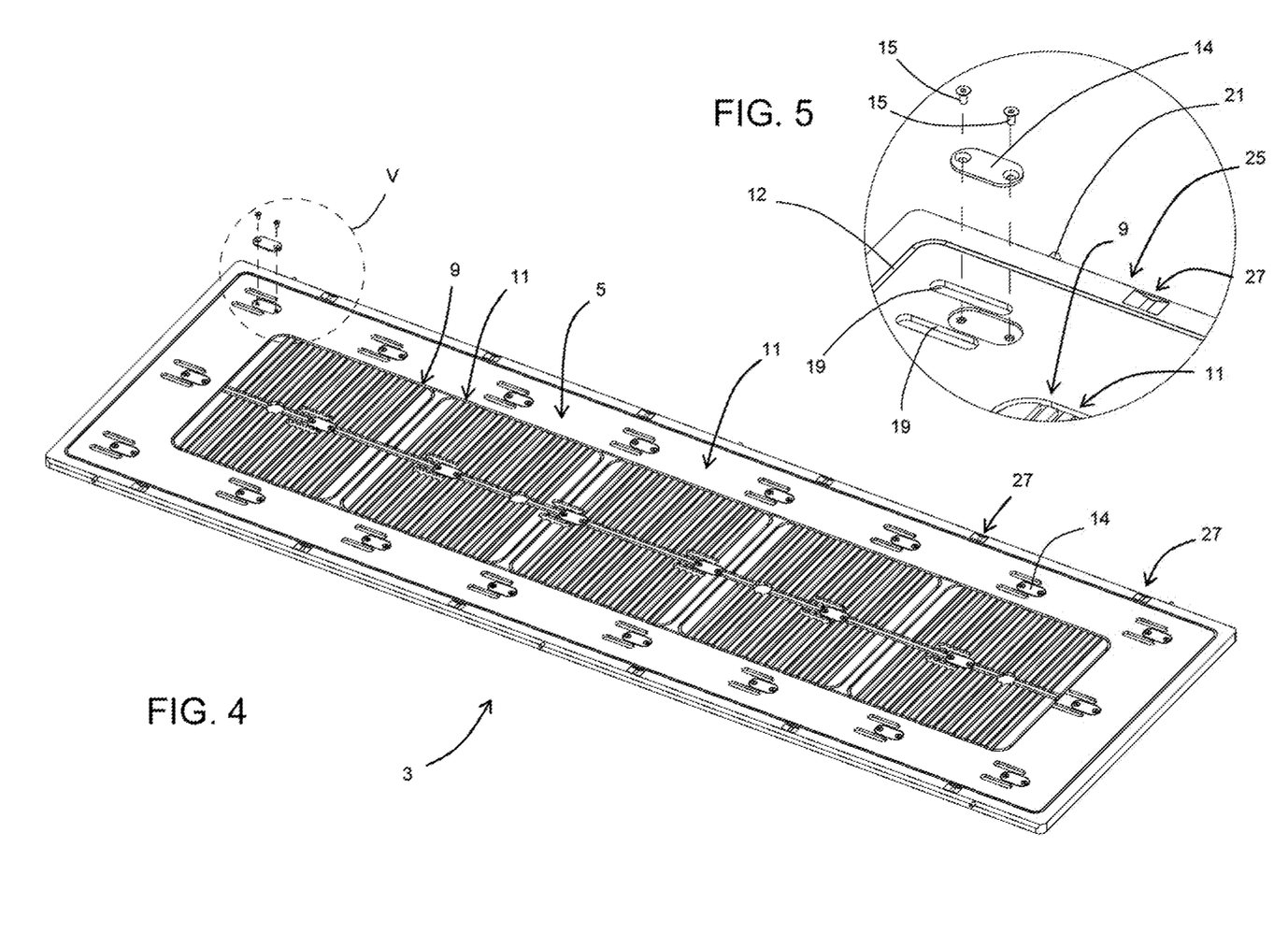
FIG. 4 shows an axonometric view of an operating plate forming part of the suction device described in the present invention and, in particular, a second connecting face associable with the first connecting face of the main supporting body in FIG. 1.
FIG. 5 shows an enlargement of detail V in FIG. 4.

The second connecting mouths 11 are advantageously constituted of one or more depressions or canals made in the second connecting face 5, arranged in such a way as to directly face the main ducts 8 when the operating plate 3 is associated with the main supporting body 2, and which operate as collectors from which the secondary ducts 9 then extend (FIG. 4).

When the operating plate 3 is associated with the main supporting body 2, the first connecting mouths 10 are actually fluidly connected to the second connecting mouths 11.

With the aim of preventing the air from being sucked into the first connecting mouths 10 through any free space present between the main supporting body 2 and the operating plate 3, thus guaranteeing that the entire suction effect is available for the suction holes 7, it is designed for there to be one or more sealing elements 12 which are associated with the operating plate 3 or with the main supporting body 2 and which are clamped between the operating plate 3 and the main supporting body 2 when the operating plate 3 is associated with the main supporting body 2 in order to create a fluid seal between the first connecting mouths 10 and the second connecting mouths 11 on the one hand and the outside on the other. In particular, the embodiment shown has designed a single sealing element 12 consisting of a rectangular-shaped seal which is placed near the edge of the first connecting face 4 (FIG. 4).

It should be noted that, if several channels or depressions are present, then depending on requirements, either these can fluidly communicate with each other or not, or the aspirator, in use, can be able or unable to maintain one depression in all channels or depressions regardless of the type and number of objects to be retained on the operating plate 3. In the embodiment shown in the accompanying figures, all channels/depressions communicate with each other and are all always in suction during use.

According to the main innovative aspect of the present invention, in order to keep each operating plate 3 associated with the main supporting body 2 fastened to the main supporting body 2 itself, for each pair constituted of the main supporting body 2 and of an operating plate 3 associated therewith, the suction device 1 also comprises one or more magnets 13 and one or more ferromagnetic bodies (14). Each ferromagnetic body 14 is magnetically coupled to one or more magnets 13 when the operating plate 3 is associated with the main supporting body 2 for keeping the operating plate 3 fastened to the main supporting body 2.

Advantageously, as shown in the accompanying figures, a plurality of pairs comprising a magnet 13 and a ferromagnetic elements is present, said pairs being evenly distributed at the first connecting face 4 and the second connecting face 5.

Each magnet 13 and the ferromagnetic body 14 magnetically coupled to it are then constrained respectively one to the operating plate 3, the other to the main supporting body 2. In the preferred embodiment, in particular, with the aim of reducing production costs, the magnets 13 are associated with the main supporting body 2 while the ferromagnetic bodies 14 are associated with all of the plates.

As shown, for example, in FIG. 5, the ferromagnetic bodies 14 are each constituted of a thin ferromagnetic sheet fixed to the second connecting face 5 of the operating plate 3 by two first screws 15 (with the screwheads not projecting from the thin sheet itself).

Figure 3:
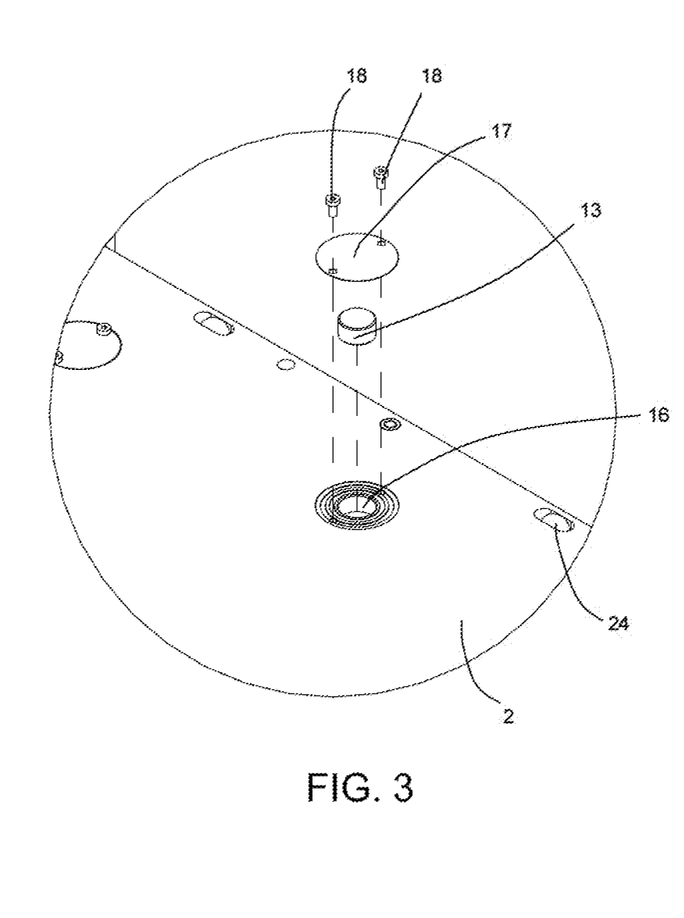

As shown in FIG. 3, on the other hand, each magnet 13 can be inserted into a purpose-designed seat 16 made in the first connecting face 4 and locked in by a covering element 17 fixed with two second screws 18. Advantageously, the covering element 17 has a reduced thickness and it therefore cannot be ensured that the heads of the second screws 18 will not project from it. To address this, two recesses 19 suitable for housing the heads of the second screws 18 are present next to each ferromagnetic body 14 fixed to the second connecting face 5 of the operating plate 3 (as shown in FIG. 5, the recesses extend lengthwise to enable the translation of the heads of the second screws 18 during the coupling between the operating plate 3 and the main supporting body 2 according to the methods described below).

Both the operating plate 3 and the main supporting body 2, on the other hand, are advantageously made of a non-magnetic material, such as aluminium.

According to a further aspect of the present invention, it is also provided that the fastening and unfastening between the operating plate 3 and the main supporting body 2 occurs via a moving of the operating plate 3, which extends at least mainly in a plane perpendicular to a reference line that, with the operating plate 3 associated with the main supporting body 2, corresponds to the line along which the distance of a central point of each magnet 13 (the centre of gravity) from the ferromagnetic body 14 coupled to it is at its minimum (in the accompanying figures, the reference line is perpendicular to the operating surface 6). The movement of the operating plate 3 also extends between a first position in which the ferromagnetic bodies (14) are magnetically coupled to the magnets 13 and a second position in which the ferromagnetic bodies 14 are magnetically substantially uncoupled from the magnets 13 (which means that the magnetic attraction exerted by the magnets 13 on the ferromagnetic bodies 14 is zero or negligible so that the operating plate 3 can be manually removed from the main supporting body 2).

In detail, the device comprises one or more fastening guides 20 and one or more fastening elements 21, where each fastening element 21 is couplable to a fastening guide 20 during the coupling of the operating plate 3 to the main supporting body 2. Each fastening element 21 and the fastening guide 20 to which it is couplable are fixed one to the operating plate 3 and the other to the main supporting body 2; in the embodiment shown, the fastening guides 20 are fixed to the main supporting body 2, while the fastening elements 21 are fixed to the operating plate 3.

As can be seen in particular in FIGS. 7, 8, 10 and 11, in the preferred embodiment the fastening elements 21 are constituted of projecting pins, while the fastening guides 20 are constituted of a groove open at one end, made in a metal flange 21 fixed to the main supporting body 2 and shaped to receive a projecting pin.

In general, each fastening guide 20 is advantageously shaped in such a way as to guide, by the interaction with the corresponding fastening element 21, a shifting of the operating plate 3 relative to the main supporting body 2 along a coupling trajectory which extends between a coupling start position in which the one or more magnets 13 and the one or more ferromagnetic bodies 14 are magnetically substantially uncoupled, and a coupling completion position in which the one or more magnets 13 and the one or more ferromagnetic bodies 14 are magnetically coupled.

Figures 7, 8, 10, 11:
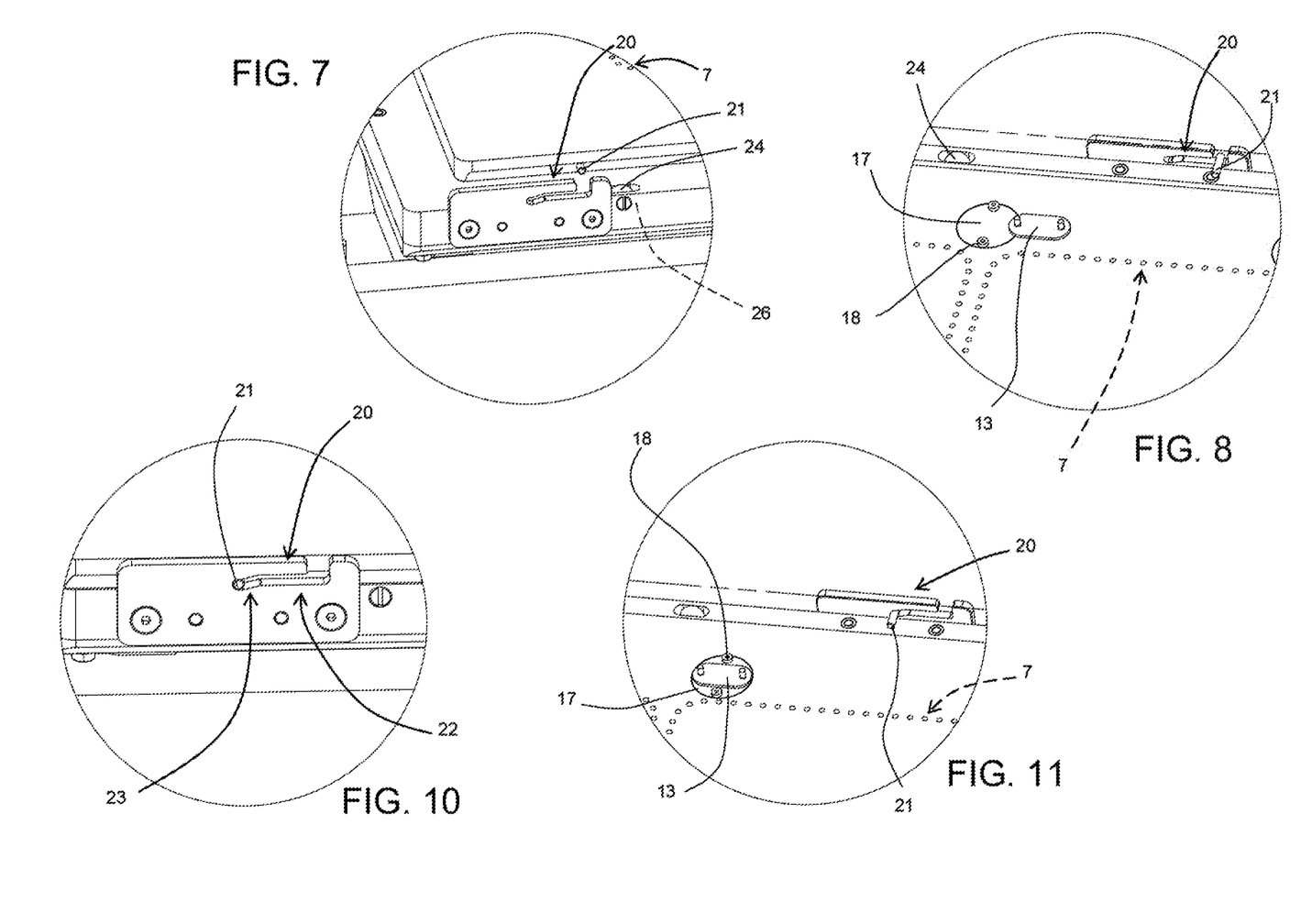
FIG. 7 shows an enlargement of detail VII in FIG. 6.
FIG. 8 shows an enlargement, with some parts left transparent, of a detail of the main supporting body in FIG. 1 and of the operating plate in FIG. 4 in a coupling start step subsequent to the step in FIG. 6.
FIG. 10 is an enlargement of detail X in FIG. 9.
FIG. 11 shows the detail in FIG. 8 when the main supporting body in FIG. 1 and the operating plate in FIG. 4 are coupled to each other as shown in FIG. 9.

With reference to the accompanying figures, the coupling start position can be identified as the position visible in FIG. 8, at which the fastening element 21 is inserted in the fastening guide 20; in this configuration, it can be seen how the ferromagnetic body 14 does not face the corresponding magnet 13 and is therefore magnetically substantially decoupled from it.

According to the preferred embodiment, then, the coupling trajectory has a main component of extension that lies in a perpendicular plane to the reference line and, in particular, comprises a first stretch 22 and a second stretch 23.

The first stretch 22 lies in a perpendicular plane to the reference line, which extends between the coupling start position and an intermediate coupling position, and is formed by a first part of the groove forming the fastening guide 20.

The second stretch 23 extends between the intermediate coupling position and the coupling completion position, has a main component of extension perpendicular to the reference line, and a secondary component of extension parallel to the reference line, and is formed by a second part of the groove forming the fastening guide 20, which is advantageously shorter than the first part. The second stretch 23 is also configured in such a way that the shifting of the operating plate 3 from the intermediate coupling position to the coupling completion position causes a drawing near of the ferromagnetic elements towards the magnets 13 both along the main component of extension and along the secondary component of extension (FIGS. 10 and 11).

With the aim of facilitating the movement of the operating plate 3 between the coupling completion position and the coupling end position, in the preferred embodiment one of either the main supporting body 2 or the operating plate 3 also comprises a plurality of idle wheels 24 and the other a plurality of corresponding running tracks 25 on which the idle wheels 24 can roll (relatively) during the shifting of the fastening elements 21 along the fastening guides 20.

Figure 1:
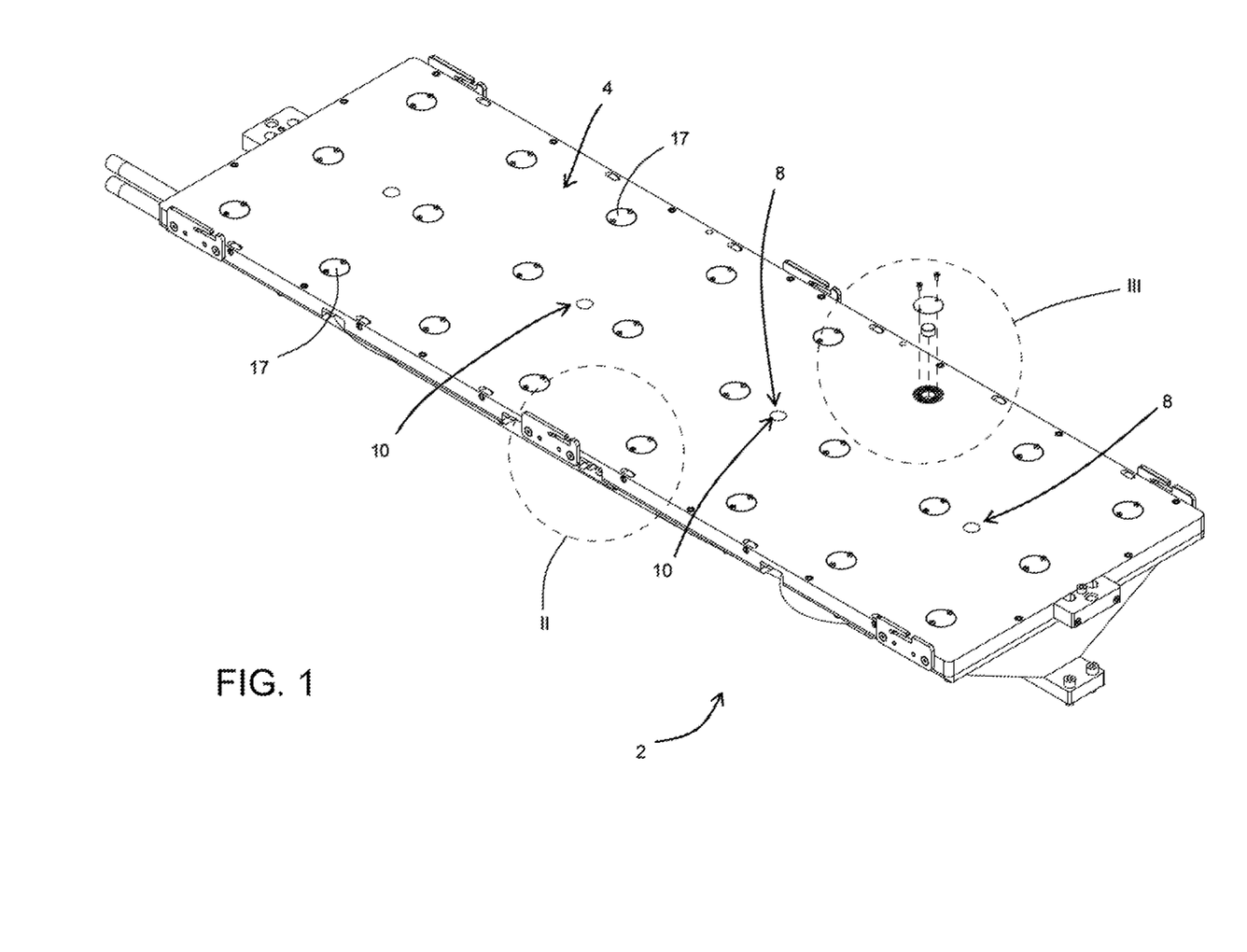
FIG. 1 shows an axonometric view of a main supporting body forming part of the suction device described in the present invention and, in particular, a first connecting face thereof.
Figure 2:
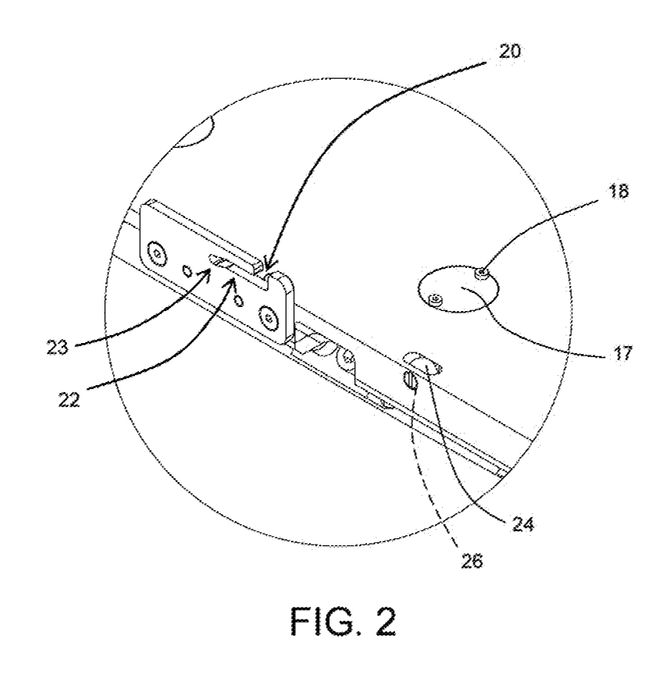
FIGS. 2 and 3 show enlargements, respectively, of details II and III in FIG. 1.

The idle wheels 24 have an axis of rotation perpendicular to a lying plane of the coupling trajectory and are advantageously mounted on corresponding seats 26 made in the first connecting face 4, relative to which they project only minimally (FIGS. 2 and 3).

The running tracks 25 are advantageously constituted by the surface of the second connecting face 5 and have a hollow 27 at the position in which the idle wheels 24 are located when the operating plate 3 is coupled to the main supporting body 2 so as to enable adequate clamping of the sealing elements 12.

Depending on the intended use of the suction device 1, this can then be designed to comprise heating means (not shown) associated with the main supporting body 2 to heat the operating plate 3 by thermal conduction, such as electrical resistors or ducts with a hot fluid flowing therein and assembled in the main supporting body 2. In particular, the presence of the heating means is particular designed for applications in which the object being retained on the operating plate 3 must be heating, as in the case of thermoforming or sealing machines wherein a thermoformable sheet or a sealing film, respectively, are to be retained.

Figure 6:
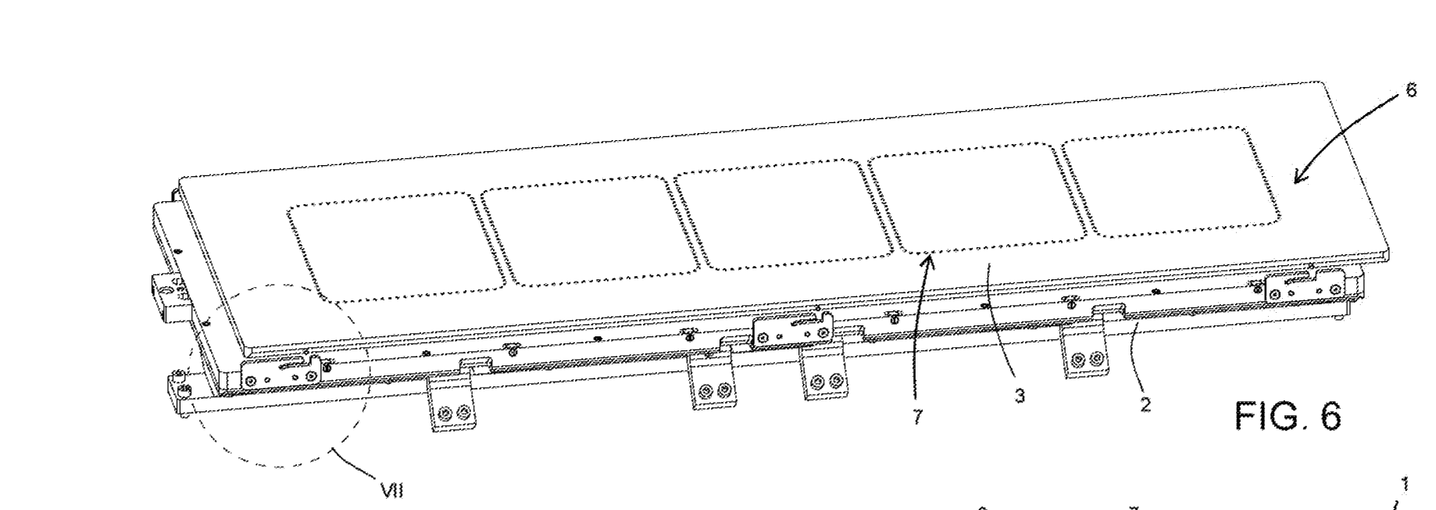
FIG. 6 shows an axonometric view of the main supporting body in FIG. 1 and the operating plate in FIG. 4 in a step preceding their coupling.

Operations for fastening an operating plate 3 to the main supporting body 2 firstly entail the operating plate 3 being positioned with the second connecting face 5 facing the first connecting face 4 and the fastening elements 21 facing the open end of the fastening guides 20 (FIG. 6).

The operating plate 3 is then drawn near to the main supporting body 2 until it reaches the coupling start position, making the fastening elements 21 enter their fastening guides 20. In this position, the running tracks 25 rest on the idle wheels 24 (FIG. 8).

The operating plate 3 is then pushed to the intermediate coupling position by rolling it on the idle wheels 24.

Figure 9:
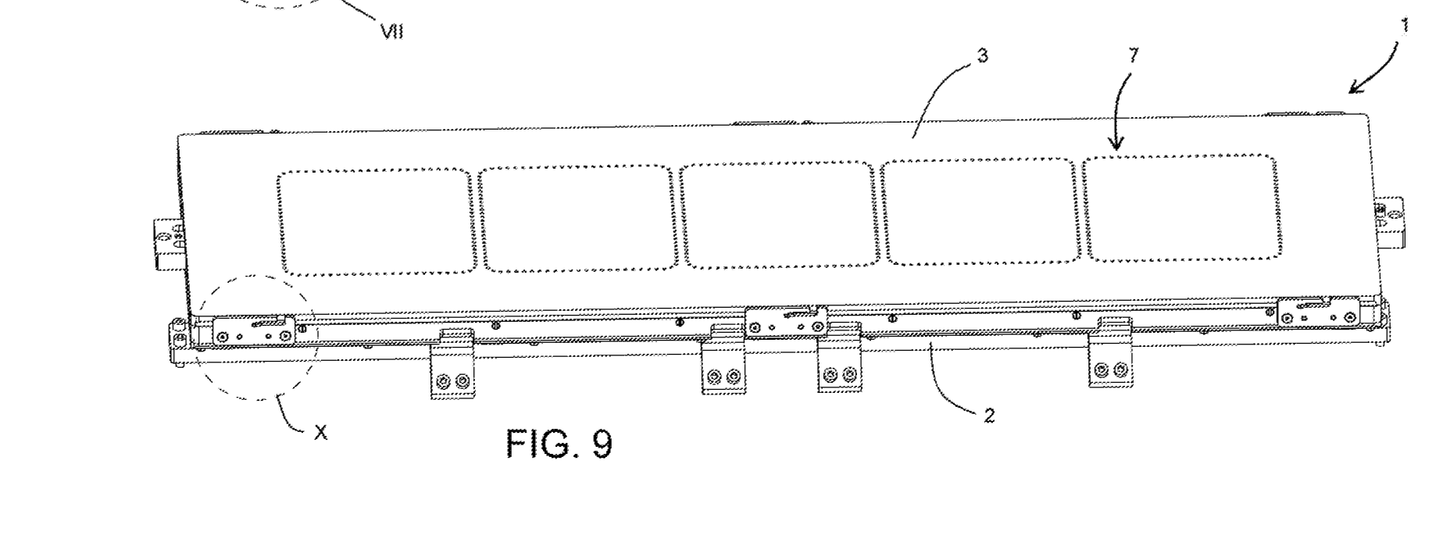
FIG. 9 shows an axonometric view of the main supporting body shown in FIG. 1 and the operating plate in FIG. 4 coupled to each other.

Finally, a subsequent push on the operating plate 3 slides the fastening elements 21 along the second part of the fastening guides 20 until it faces and magnetically fastens the ferromagnetic bodies 14 to the magnets 13 (the projecting parts of the idle wheels 24 are housed in the corresponding hollows 27—FIGS. 9 and 10).

To unfasten, on the other hand, it is sufficient to push the operating plate 3 in the opposite direction, possibly using a purpose-designed tool; indeed, the shape of the fastening guides 20 means that a reduced force can be exerted to laterally move the operating plate 3 from the coupling completion position to the intermediate coupling position.

As stated above, the suction device 1 according to the present invention can be used in any context. However, it was initially developed as a component of apparatuses for thermoforming or sealing containers.

In particular, when the suction device 1 is used in an apparatus for thermoforming containers, the device described in the present invention can advantageously be designed to constitute a closing element of a thermoforming device which further comprises a shaped mould. In that event, the shaped mould and the closing element are movable relative to each other between a home position in which they are at a distance from one another, and a forming position in which they are near each other for, in use, clamping between them a flat sheet of thermoformable plastic material. When these are in the forming position, the operating surface 6 is facing the shaped mould, while the suction means are suitable for retaining on the operating surface 6 at least one flat sheet at least when the shaped mould and the closing element are in the home position.

If, on the other hand, the suction device is part of a sealing apparatus, it can advantageously be used to retain and heat the sealing film, which is then applied to the container to be sealed by clamping the film itself and the container to be sealed between the suction device and a corresponding counter-pressure device.

The present invention offers significant advantages.

Indeed, thanks to the present invention, it has been possible to implement a suction device for retaining and/or transporting objects that makes size changing operations extremely quicker and easier than in known devices, as the complex operations of assembling and disassembling the operating plates are not required.

Finally, it is worth noting that the present invention is relatively easy to make and that the cost associated with its implementation is also extremely low. Many modifications and variations can be made to the invention as designed herein without departing from the scope of the present invention.

All details can be replaced by other technically equivalent details and any materials, shapes and dimensions of the various components may be used according to requirements.

The invention claimed is:

1. A suction device for retaining and/or transporting objects, comprising:
   a main supporting body (2);
   at least one operating plate (3) mounted on the main supporting body (2), the at least one operating plate (3) having an operating surface (6), and in which a plurality of suction holes (7) is positioned; and
   suction means in fluid connection with said plurality of suction holes (7) for sucking air through said plurality of suction holes (7);
   wherein:
   the at least one operating plate (3) is removably coupled to the main supporting body (2);
   the main supporting body (2) has at least one first connecting face (4); and
   the at least one operating plate (3) has a second connecting face (5) placed on the opposite side to the operating surface (6) and which is coupled to the at least one first connecting face (4) when the at least one operating plate (3) is coupled to the main supporting body (2);
   the suction device further comprises one or more magnets (13) and one or more ferromagnetic bodies (14), each of the one or more ferromagnetic bodies (14) being magnetically coupled to one or more of the one or more magnets (13) when the at least one operating plate (3) is coupled to the main supporting body (2) for keeping the at least one operating plate (3) fastened to the main supporting body (2), one between the one or more magnets (13) and the one or more ferromagnetic bodies (14) magnetically coupled to each other being constrained to the at least one operating plate (3), the other between the one or more magnets (13) and the one or more ferromagnetic bodies (14) magnetically coupled to each other being constrained to the main supporting body (2);
   the suction device further comprises one or more fastening guides (20) and one or more fastening elements (21), each of the one or more fastening elements (21) being couplable to one of the one or more fastening guides (20) during the coupling of the at least one operating plate (3) to the main supporting body (2), one between the one or more fastening elements (21) and the one or more fastening guides (20) which are couplable to each other, being fixed to the at least one operating plate (3) and the other between the one or more fastening elements (21) and the one or more fastening guides (20) which are couplable to each other being fixed to the main supporting body (2);
   each of the one or more fastening guides (20) is shaped in such a way as to guide, by the interaction with a corresponding one of the one or more fastening elements (21), a shifting of the at least one operating plate (3) relative to the main supporting body (2) along a coupling trajectory which extends between a coupling start position, in which the one or more magnets (13) and the one or more ferromagnetic bodies (14) are magnetically uncoupled, and a coupling completion position, in which the one or more magnets (13) and the one or more ferromagnetic bodies (14) are magnetically coupled; and
   said coupling trajectory has a main component of extension which lies in a plane perpendicular to a reference line that, with the at least one operating plate (3) coupled to the main supporting body (2), corresponds to a line along which a central point of each one of the one or more magnets (13) is at a minimum distance from the one or more ferromagnetic bodies (14) coupled to said one of the one or more magnets.

2. The suction device according to claim 1 wherein the suction means comprises one or more main ducts (8) located in the main supporting body (2) and which extend as far as the at least one first connecting face (4) where the one or more main ducts define one or more first connecting mouths (10), wherein the suction means comprises one or more secondary ducts (9) made in the at least one operating plate (3) and which extend from the second connecting face (5), where one or more secondary ducts define one or more second connecting mouths (11), as far as the suction holes (7), and wherein when the at least one operating plate (3) is coupled to the main supporting body (2) the first connecting mouths (10) are fluidly connected to the second connecting mouths (11).

3. The suction device of claim 2 wherein the suction device also comprises one or more sealing elements (12) coupled to the at least one operating plate (3) or to the main supporting body (2), and which are clamped between the at least one operating plate (3) and the main supporting body (2) when the at least one operating plate (3) is coupled to the main supporting body (2) to create a fluid seal between the first connecting mouths (10) and the second connecting mouths (11) and an outside of the at least one first connecting face and the second connecting face.

4. The suction device of claim 1 wherein said coupling trajectory comprises a first stretch (22) perpendicular to the reference line, which extends between the coupling start position and an intermediate coupling position, and a second stretch (23) which extends between the intermediate coupling position and the coupling completion position and which has a main component of extension perpendicular to the reference line, and a secondary component of extension parallel to the reference line, the guided shifting of the at least one operating plate (3) from the intermediate coupling position to the coupling completion position along the coupling trajectory corresponding to a drawing near of the ferromagnetic elements towards the magnets (13) both along the main component of extension and along the secondary component of extension.

5. The suction device of claim 4 wherein one of either the main supporting body (2) or the at least one operating plate (3) also comprises a plurality of idle wheels (24) with axis of rotation perpendicular to a lying plane of the coupling trajectory, and the other of either the main supporting body (2) or the at least one operating plate (3) comprises a plurality of corresponding running tracks (25) on which the idle wheels (24) can roll during the shifting of the one or more fastening elements (21) along the one or more fastening guides (20).

6. The suction device of claim 1, wherein the suction device comprises a plurality of pairs each comprising one of said one or more magnets (13) and one of said one or more ferromagnetic bodies, those pairs being evenly distributed at the at least one first connecting face (4) and the second connecting face (5).

7. The suction device of claim 1, wherein the main supporting body (2) comprises a plurality of first connecting faces, the suction device further comprises a plurality of operating plates (3) and in that each of said plurality of operating plates (3) is removably coupled to one of the plurality of first connecting faces of the main supporting body (2).

8. The suction device of claim 1, wherein the suction device further comprises, for each of the at least one first connecting face (4) present on the main supporting body (2), a plurality of operating plates (3) which are interchangeable and couplable to the main supporting body (2), each operating plate (3) of said plurality of operating plates (3) having a different arrangement of the suction holes (7) on the operating surface (6).

9. The suction device of claim 1, wherein the suction device further comprises heating means coupled to the main supporting body (2) for heating the at least one operating plate (3).

10. The suction device of claim 1, wherein each of the at least one operating plate (3) is constituted of a single element or of a plurality of elements which can be placed side by side, each element of the plurality of elements defining part of the operating surface (6) and part of the second connecting face (5).

11. An apparatus for thermoforming containers comprising a suction device (1) for retaining and/or transporting objects which comprises:
a main supporting body (2);
at least one operating plate (3) mounted on the main supporting body (2), the at least one operating plate (3) having an operating surface (6), and in which a plurality of suction holes (7) is positioned; and
suction means in fluid connection with said plurality of suction holes (7) for sucking air through said plurality of suction holes (7);
wherein:
the at least one operating plate (3) is removably coupled to the main supporting body (2);
the main supporting body (2) has at least one first connecting face (4); and
the at least one operating plate (3) has a second connecting face (5) placed on the opposite side to the operating surface (6) and which is coupled to the at least one first connecting face (4) when the at least one operating plate (3) is coupled to the main supporting body (2);
the suction device further comprises one or more magnets (13) and one or more ferromagnetic bodies (14), each of the one or more ferromagnetic bodies (14) being magnetically coupled to one or more of the one or more magnets (13) when the at least one operating plate (3) is coupled to the main supporting body (2) for keeping the at least one operating plate (3) fastened to the main supporting body (2), one between the one or more magnets (13) and the one or more ferromagnetic bodies (14) magnetically coupled to each other being constrained to the at least one operating plate (3), the other between the one or more magnets (13) and the one or more ferromagnetic bodies (14) magnetically coupled to each other being constrained to the main supporting body (2);
the suction device further comprises one or more fastening guides (20) and one or more fastening elements (21), each of the one or more fastening elements (21) being couplable to one of the one or more fastening guides (20) during the coupling of the at least one operating plate (3) to the main supporting body (2), one between the one or more fastening elements (21) and the one or more fastening guides (20) which are couplable to each other, being fixed to the at least one operating plate (3) and the other between the one or more fastening elements (21) and the one or more fastening guides (20) which are couplable to each other being fixed to the main supporting body (2);
each of the one or more fastening guides (20) is shaped in such a way as to guide, by the interaction with a corresponding one of the one or more fastening elements (21), a shifting of the at least one operating plate (3) relative to the main supporting body (2) along a coupling trajectory which extends between a coupling start position, in which the one or more magnets (13) and the one or more ferromagnetic bodies (14) are magnetically uncoupled, and a coupling completion position, in which the one or more magnets (13) and the one or more ferromagnetic bodies (14) are magnetically coupled; and
said coupling trajectory has a main component of extension which lies in a plane perpendicular to a reference line that, with the at least one operating plate (3) coupled to the main supporting body (2), corresponds to a line along which a central point of each one of the one or more magnets (13) is at a minimum distance from the one or more ferromagnetic bodies (14) coupled to said one of the one or more magnets.

12. The apparatus for thermoforming containers of claim 11 comprising a thermoforming device comprising a shaped mould and a closing element, the shaped mould and the closing element being movable relative to each other at least between a home position in which the shaped mould and the closing element are at a distance from one another, and a forming position in which the shaped mould and the closing element are near each other for, in use, clamping a flat sheet of thermoformable material between them; the closing element being constituted of said suction device (1) and the operating surface (6) facing the shaped mould at least when the closing element and the shaped mould are in the forming position, and the suction means being suitable for retaining on the operating surface (6) at least one of said flat sheets at least when the shaped mould and the closing element are in the home position.

13. An apparatus for sealing containers comprising a suction device (1) for retaining and/or transporting objects which comprises:
- a main supporting body (2);
- at least one operating plate (3) mounted on the main supporting body (2), the at least one operating plate (3) having an operating surface (6), and in which a plurality of suction holes (7) is positioned; and
- suction means in fluid connection with said plurality of suction holes (7) for sucking air through said plurality of suction holes (7);

wherein:
- the at least one operating plate (3) is removably coupled to the main supporting body (2);
- the main supporting body (2) has at least one first connecting face (4); and
- the at least one operating plate (3) has a second connecting face (5) placed on the opposite side to the operating surface (6) and which is coupled to the at least one first connecting face (4) when the at least one operating plate (3) is coupled to the main supporting body (2);
- the suction device further comprises one or more magnets (13) and one or more ferromagnetic bodies (14), each of the one or more ferromagnetic bodies (14) being magnetically coupled to one or more of the one or more magnets (13) when the at least one operating plate (3) is coupled to the main supporting body (2) for keeping the at least one operating plate (3) fastened to the main supporting body (2), one between the one or more magnets (13) and the one or more ferromagnetic bodies (14) magnetically coupled to each other being constrained to the at least one operating plate (3), the other between the one or more magnets (13) and the one or more ferromagnetic bodies (14) magnetically coupled to each other being constrained to the main supporting body (2);
- the suction device further comprises one or more fastening guides (20) and one or more fastening elements (21), each of the one or more fastening elements (21) being couplable to one of the one or more fastening guides (20) during the coupling of the at least one operating plate (3) to the main supporting body (2), one between the one or more fastening elements (21) and the one or more fastening guides (20) which are couplable to each other, being fixed to the at least one operating plate (3) and the other between the one or more fastening elements (21) and the one or more fastening guides (20) which are couplable to each other being fixed to the main supporting body (2);
- each of the one or more fastening guides (20) is shaped in such a way as to guide, by the interaction with a corresponding one of the one or more fastening elements (21), a shifting of the at least one operating plate (3) relative to the main supporting body (2) along a coupling trajectory which extends between a coupling start position, in which the one or more magnets (13) and the one or more ferromagnetic bodies (14) are magnetically uncoupled, and a coupling completion position, in which the one or more magnets (13) and the one or more ferromagnetic bodies (14) are magnetically coupled; and
- said coupling trajectory has a main component of extension which lies in a plane perpendicular to a reference line that, with the at least one operating plate (3) coupled to the main supporting body (2), corresponds to a line along which a central point of each one of the one or more magnets (13) is at a minimum distance from the one or more ferromagnetic bodies (14) coupled to said one of the one or more magnets.

* * * * *